US008040649B2

(12) United States Patent
Kido et al.

(10) Patent No.: US 8,040,649 B2
(45) Date of Patent: Oct. 18, 2011

(54) OVERCURRENT PROTECTION APPARATUS AND ELECTRONIC APPARATUS

(75) Inventors: Keisuke Kido, Kobe (JP); Kazuhiro Komatsu, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 465 days.

(21) Appl. No.: 12/395,007

(22) Filed: Feb. 27, 2009

(65) Prior Publication Data

US 2009/0225478 A1 Sep. 10, 2009

(30) Foreign Application Priority Data

Feb. 27, 2008 (JP) ................................ 2008-046858

(51) Int. Cl.
*H02H 3/08* (2006.01)
*H02H 9/02* (2006.01)

(52) U.S. Cl. ...................................................... 361/93.1

(58) Field of Classification Search .................. 361/93.1
See application file for complete search history.

(56) References Cited

U.S. PATENT DOCUMENTS 4,533,970 A * 8/1985 Brown ............................ 361/58
4,665,458 A * 5/1987 Matsuoka et al. .............. 361/18
4,686,436 A * 8/1987 Archer ..................... 318/400.26
2002/0140409 A1 10/2002 Takeda et al.
2007/0217238 A1* 9/2007 Kanayama .................... 363/125
2009/0225478 A1* 9/2009 Kido et al. ....................... 361/18
2010/0026265 A1* 2/2010 Kuno et al. ................... 323/284

FOREIGN PATENT DOCUMENTS

JP 2002-297249 10/2002
JP 2003-241842 8/2003
JP 2006-127253 5/2006

* cited by examiner

*Primary Examiner* — Ronald W Leja
(74) *Attorney, Agent, or Firm* — Wenderoth, Lind & Ponack, L.L.P.

(57) ABSTRACT

An overcurrent protection apparatus includes two overcurrent protection circuits. The first overcurrent protection circuit compares an electric potential on the downstream side of a first resistance element with a reference potential produced by a second resistance element by a comparator and determines that overcurrent has been caused and intercepts current flowing through a first series regulator when the electric potential on the downstream side of the first resistance element is lower than the reference potential. When the resistance value of the second resistance element is larger than the resistance value of a fourth resistance element of the second overcurrent protection circuit, e.g., 1.2 times the resistance value of the fourth resistance element, the first overcurrent protection circuit intercepts the current flowing through the first series regulator at a current value of 1.2 times a current at which a downstream second series regulator is intercepted by the second overcurrent protection circuit.

7 Claims, 5 Drawing Sheets

OVERCURRENT PROTECTION APPARATUS AND ELECTRONIC APPARATUS

BACKGROUND OF THE INVENTION

1. Field of the Invention

The present invention relates to an overcurrent protection apparatus that detects an overcurrent of series regulators of plural stages and protect the series regulators from the overcurrent, and an electronic apparatus.

2. Description of the Related Art

A series regulator steps down, for example, a battery voltage to a stable voltage and outputs the stepped-down voltage. However, a loss caused by the output transistor disposed in the regulator is large, so that the overcurrent protection apparatus employs a construction in which the loss is dispersed by additionally disposing a regulator in a former stage to construct the regulator in two stages or by disposing means for stepping down voltage at the former stage.

A power supply system described in Japanese Unexamined Patent Publication JP-A 2002-297249 includes a series regulator and a power consuming part disposed on a direct current passage between a direct current power source connected to the power supply system and the input side of the series regulator. The power supply system disperses the power loss, that is, loss of the whole circuit into the series regulator and the power consuming part, thereby reducing the heat produced by the series regulator.

A direct current stabilizing power supply system described in JP-A 2003-241842 includes: a voltage step-down part for stepping-down a first direct current voltage to be inputted to a second direct current voltage; a series type regulator, that is, series regulator for stepping-down the second direct current voltage to a third direct current voltage; and a comparison circuit for determining whether or not the first direct current voltage is a specified reference value or less. The direct current stabilizing power supply system disperses loss into the voltage step-down part and the series type regulator, and when the first direct current voltage is the specified reference value or less, the comparison circuit controls the voltage step-down part in such a way that voltages at the input terminal and the output terminal of the voltage step-down part are brought into the same voltage. With this, even when an input voltage becomes low, the direct current stabilizing power supply system can keep a constant output voltage.

A power supply circuit system described in JP-A 2006-127253 includes regulator circuit sections of N stages connected in series, and each of the regulator circuit sections performs a direct current voltage conversion. The power supply circuit system can reduce the allowable loss of each regulator circuit section to 1/N and hence can reduce the heat produced by each regulator circuit section.

These systems disperse the loss into the power consuming part, the voltage step-down part, or the plural series regulators. In the case of dispersing the loss into the plural series regulators, to prevent each series regulator from being broken by overcurrent, each series regulator is provided with an overcurrent protection circuit. The overcurrent protection circuit is a circuit that detects a current value of current flowing through the series regulator and which intercepts the current flowing through the series regulator when the detected current value is larger than a specified reference current value showing overcurrent.

However, in the case where the reference current value by which the overcurrent protection circuit of the series regulator of the former stage determines that a detected current value is overcurrent is smaller than a reference current value by which the overcurrent protection circuit of the series regulator of the latter stage determines that a detected current value is overcurrent, when the output side of the series regulator of the latter stage is grounded to cause overcurrent, the overcurrent protection circuit of the series regulator of the former stage operates before the overcurrent protection circuit of the series regulator of the latter stage operates. The series regulator of the latter stage is brought into a conducting state until the overcurrent protection circuit of the series regulator of the former stage operates, whereby the electric potential of the output side of the series regulator of the former stage drops to a ground level. At this time, the same overcurrent flows through the series regulator of the former stage and the series regulator of the latter stage, and since a voltage drop of the series regulator of the former stage is large, there is the possibility that the loss will be concentrated on the series regulator of the former stage to break the element of the series regulator of the former stage because the loss is over the allowable loss of the series regulator.

Further, in the case where the reference current value of the series regulator of the former stage is excessively large, when the output side of the series regulator of the former stage is grounded to cause overcurrent, there is the possibility that until the overcurrent reaches the reference current value, the overcurrent protection circuit will not operate to cause a large voltage drop in the series regulator of the former stage, which causes a break in the element of the series regulator of the former stage because the loss is over the allowable loss of the series regulator.

SUMMARY OF THE INVENTION

An object of the invention is to provide an overcurrent protection apparatus that can protect all series regulators even when overcurrent is caused by a ground fault on the output side of the series regulator of a final stage, and an electronic apparatus.

The invention provides an overcurrent protection apparatus comprising a plurality of overcurrent protection circuits connected in series, for protecting each of a plurality of series regulators from overcurrent, the plurality of overcurrent protection circuits each being disposed for each of the plurality of series regulators. The overcurrent protection circuit intercepts a current flowing from an input side to an output side of the series regulator of a protection object according to a magnitude of the current flowing through the series regulator of the protection object disposed for the overcurrent protection circuit, and when the magnitude of the current flowing through the series regulator of the protection object is smaller than the magnitude of the current flowing through the overcurrent protection circuit disposed for an upstream series regulator of two series regulators connected adjacently to each other, the overcurrent protection circuit disposed for a downstream series regulator of the two series regulators intercepts the current flowing from the input side to the output side of the series regulator of the protection object.

According to the invention, when each of the plurality of series regulators connected in series are protected from overcurrent by the overcurrent protection circuits disposed for the respective series regulators, the current flowing from the input side to the output side of the series regulator of the protection object is intercepted by the overcurrent protection circuit according to the magnitude of the current flowing through the series regulator of the protection object disposed for the overcurrent protection circuit, and when the magnitude of the current flowing through the series regulator of the protection object is smaller than the magnitude of the current flowing through the overcurrent protection circuit disposed for the upstream series regulator of two series regulators connected adjacently to each other, the current flowing from the input side to the output side of the series regulator of the protection object is intercepted by the overcurrent protection circuit disposed for the downstream series regulator of the two series regulators.

Thus, the overcurrent protection circuit on the downstream side operates first, so that even when overcurrent is caused by a ground fault on the output side of the series regulator of the final stage, all series regulators can be protected.

Further, the invention provides an electronic apparatus comprising a plurality of series regulators and the above-mentioned overcurrent protection apparatus for protecting the plurality of series regulators from overcurrent.

According to the invention, the electronic apparatus comprises a plurality of series regulators and an overcurrent protection apparatus for protecting the plurality of series regulators from overcurrent, so that even when overcurrent is caused by a ground fault on the output side of the series regulator of the final stage of the plural series regulators provided in the electronic apparatus, all of the series regulators can be protected from overcurrent. Thus, the electronic apparatus resistant to the ground fault can be realized.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
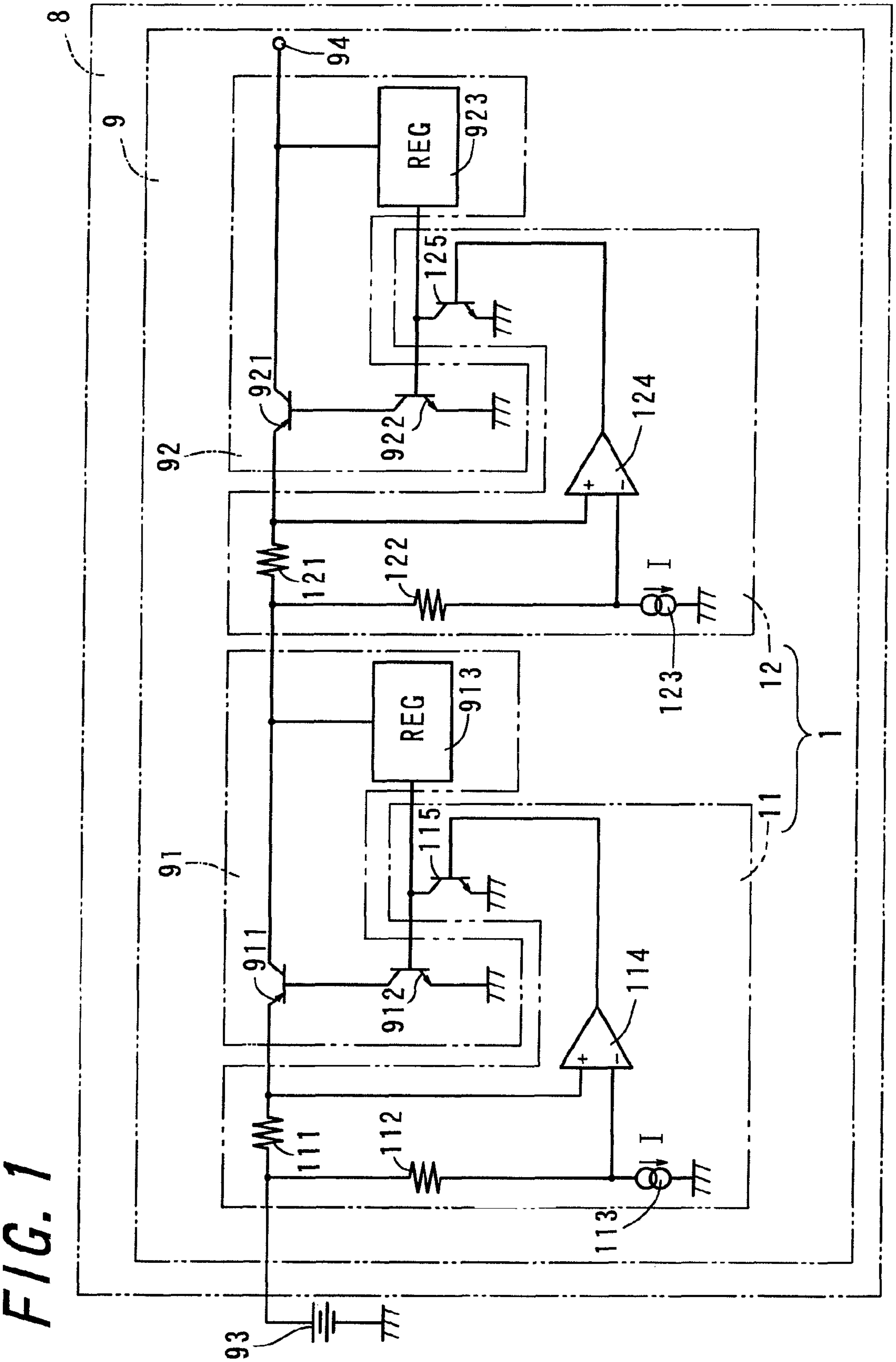
FIG. 1 is a diagram showing the circuit construction of an overcurrent protection apparatus and a power supply system according to one embodiment of the invention.

Now referring to the drawings, preferred embodiments of the invention will be described in detail.

FIG. 1 is a diagram showing the circuit construction of an overcurrent protection apparatus 1 and a power supply system 9 according to one embodiment of the invention. The power supply system 9 includes two series regulators 91 and 92 connected in series and the overcurrent protection apparatus 1, and is connected to a power source 93 and is disposed in, for example, an electronic apparatus 8 that will be described later. The power source 93 is a direct current power source such as a battery mounted in a vehicle, for example, and has an output voltage of, for example, 16V. First and second series regulators 91 and 92 are series type regulators for converting an input voltage to an output voltage, respectively. In the first series regulator 91, the input side of the first series regulator 91 is connected to the power source 93 via a resistance element 111 and the output side thereof is connected to the input side of the second series regulator 92 via a resistance element 121. The second series regulator 92 has an output side connected to an output terminal 94.

The first series regulator 91 includes transistors 911 and 912 and a regulator control circuit (referred to as "Reg" in Figs.) 913. The transistor 911, which is a PNP-type transistor, has an emitter connected to the upstream resistance element 111 and has a collector connected to the downstream resistance element 121 and has a base connected to a collector of the transistor 912.

The transistor 911 converts an input voltage of, for example, 16V to a specified output voltage of, for example, 10V and outputs the output voltage.

The transistor 912, which is an NPN-type transistor, has an emitter connected to the ground and a base connected to a regulator control circuit 913. The regulator control circuit 913 detects an output voltage outputted from the collector of the transistor 911 and changes a current to be supplied to the base of the transistor 912 so as to control the base current of the transistor 911, thereby controlling the output voltage of the transistor 911 to a specified voltage.

The second series regulator 92 includes transistors 921 and 922 and a regulator control circuit 923. The transistor 921, which is a PNP-type transistor, has an emitter connected to the upstream resistance element 121, a collector connected to the output terminal 94, and a base connected to a collector of a transistor 922.

The transistor 922, which is a NPN-type transistor, has an emitter connected to the ground and a base connected to a regulator control circuit 923. The regulator control circuit 923 detects an output voltage outputted from the collector of the transistor 921 and changes a current to be supplied to the base of the transistor 922 so as to control the base current of the transistor 921, thereby controlling the output voltage of the transistor 911 to a specified voltage.

Thus, the internal circuit construction of the second series regulator 92 is similar to the internal circuit construction of the first series regulator 91. However, the transistor 921 converts an input voltage of, for example, 10V to a specified output voltage of, for example, 5V and outputs the output voltage.

The overcurrent protection apparatus 1 includes two overcurrent protection circuits 11 and 12. A first overcurrent protection circuit 11 detects a current value of current flowing through the upstream side of the first series regulator 91 and intercepts the current flowing through the first series regulator 91 when the detected current value is larger than a reference current value previously determined for the first series regulator 91, thereby protecting the first series regulator 91 from overcurrent.

The first overcurrent protection circuit 11 includes first and second resistance elements 111 and 112, a constant current source 113, a comparator 114, and a transistor 115. The first resistance element 111, which is a current measuring resistor for measuring the current value of current flowing through the upstream side of the first series regulator 91, has one end connected to the power source 93 and has the other end connected to the emitter of the transistor 911. By measuring a voltage drop of the first resistance element 111, that is, a difference in an electric potential between both ends of the first resistance element 111, the current value of current flowing through the first resistance element 111 can be found.

The second resistance element 112, which is a reference potential producing resistor for producing a reference potential corresponding to a reference current value of the first series regulator 91, has one end connected to the upstream side of the first resistance element 111 and the other end connected to the constant current source 113. The constant current source 113 is a constant current source for feeding current of a constant current value I to the second resistance element 112. The second resistance element 112 causes a voltage drop by the current fed from the constant current source 113, and an electric potential subjected to the voltage drop becomes the reference potential. The comparator 114 compares an electric potential on the downstream side of the resistance element 11 with the electric potential subjected to the voltage drop by the second resistance element 112, that is, the reference potential and outputs voltage to bring the transistor 115 into a conducting state when the electric potential on the downstream side of the first resistance element 111 is lower than the reference potential.

The transistor 115, which is an NPN transistor for intercepting current flowing through the first series regulator 91, has a base connected to the output of the comparator 114, a collector connected to the base of the transistor 912, and an emitter connected to the ground. When the comparator 114 outputs voltage to bring the transistor 115 into a conducting state, the transistor 115 is brought into the conducting state to bring the electric potential of the base of the transistor 912 into the electric potential of the ground. When the transistor 912 has the electric potential of the base brought into the electric potential of the ground, in the transistor 912, the current flowing from the collector to the emitter of the transistor 912, that is, a current to be supplied to the base of the transistor 911 is intercepted and a current flowing from the emitter to the collector of the transistor 911 is also intercepted.

The second overcurrent protection circuit 12 detects a current value of current flowing through the upstream side of the second series regulator 92 and intercepts the current flowing through the second series regulator 92 when the detected current value is larger than a reference current value previously determined for the second series regulator 92, thereby protecting the second series regulator 92 from overcurrent.

The second overcurrent protection circuit 12 includes third and fourth resistance elements 121 and 122, a constant current source 123, a comparator 124, and a transistor 125. The third resistance element 121, which is a current measuring resistor for measuring the current value of current flowing through the upstream side of the second series regulator 92, has one end connected to the collector of the transistor 911 and has the other end connected to the emitter of the transistor 921. By measuring a voltage drop of the third resistance element 121, that is, a difference in the electrical potential between both ends of the third resistance element 121, the current value of current flowing through the third resistance element 121 can be found.

The fourth resistance element 122, which is a reference potential producing resistor for producing a reference potential corresponding to a reference current value of the second series regulator 92, has one end connected to the upstream side of the third resistance element 121 and the other end connected to the constant current source 123. The constant current source 123 is a constant current source for feeding current of a constant current value I to the fourth resistance element 122. The fourth resistance element 122 causes a voltage drop by the current fed from the constant current source 123, and an electric potential subjected to the voltage drop becomes the reference potential. The comparator 124 compares an electric potential on the downstream side of the third resistance element 121 with the electric potential subjected to the voltage drop by the fourth resistance element 122, that is, the reference potential and outputs a voltage to bring the transistor 125 into a conducting state when the electric potential on the downstream side of the first resistance element 121 is lower than the reference potential.

The transistor 125, which is an NPN transistor for intercepting current flowing through the second series regulator 92, has a base connected to the output of the comparator 124, a collector connected to the base of the transistor 922, and an emitter connected to the ground. When the comparator 124 outputs a voltage to bring the transistor 125 into a conducting state, the transistor 125 is brought into the conducting state to bring the electric potential of the base of the transistor 922 into the electric potential of the ground. When the transistor 922 has the electric potential of the base brought into the electric potential of the ground, in the transistor 922, the current flowing from the collector to the emitter of the transistor 922, that is, a current to be supplied to the base of the transistor 921 is intercepted and a current flowing from the emitter to the collector of the transistor 921 is also intercepted.

Thus, the internal circuit construction of the second overcurrent protection circuit 12 is similar to the internal circuit construction of the first overcurrent protection circuit 11. The third and fourth resistance elements 121 and 122 correspond to the first and second resistance elements 111 and 112, respectively, the constant current source 123 corresponds to the constant current source 113, the comparator 121 corresponds to the comparator 114, and the transistor 125 corresponds to the transistor 115. The resistance value of the first resistance element 111 is the same value as the resistance value of the third resistance element 121, and the current value of current fed from the constant current source 113 is the same value as the current value I of current fed from the constant current source 123, but the resistance value of the second resistance element 112 is larger than the resistance value of the fourth resistance element 122 and is, for example, 1.2 times the resistance value of the fourth resistance element 122.

The current value of current flowing through the second resistance element 112 is the same as the current value I of current flowing through the fourth resistance element 122 and the resistance value of the second resistance element 112 is 1.2 times the resistance value of the fourth resistance element 122, so that the voltage drop of the second resistance element 112 is 1.2 times the voltage drop of the fourth resistance element 122. Thus, the comparator 114 brings the transistor 115 into the conducting state at a reference current value of 1.2 times the reference current value at which the comparator 124 brings the transistor 125 into the conducting state. That is, when the current of a current value of 1.2 times the reference current value at which the second overcurrent protection circuit 12 intercepts a current flowing through the second series regulator 92, flows through the first series regulator 91, the first overcurrent protection circuit 11 intercepts current flowing through the first series regulator 91.

In this manner, the reference current value previously determined for the first series regulator 91 is set at a value larger than the reference current value previously determined for the second series regulator 92, for example, a value of 1.2 times the reference current value. In other words, the reference current values of the respective series regulators are determined in such a way that even when each of the series regulators causes a ground fault on its output side, the loss of the transistor of each of the series regulators, for example, the transistors 911 and 912 becomes smaller than the allowable loss of each transistor.

In this manner, the resistance values of the respective current measuring resistors, for example, the first and third resistance elements 111 and 121 of the plural overcurrent protection circuits, for example, the first and second overcurrent protection circuits 11 and 12 are equal to each other, and the current values of currents fed by the respective constant current sources, for example, the constant current sources 113 and 123 of the plural overcurrent protection circuits, for example, the first and second overcurrent protection circuits 11 and 12 are equal to each other, and the resistance value of the reference potential producing resistor, for example, the second resistance element 112 of the upstream overcurrent protection circuit, for example, the first overcurrent protection circuit 11 is a value obtained by multiplying the resistance value of the reference potential producing resistor, for example, the fourth resistance element 122 of the downstream overcurrent protection circuit, for example, the second overcurrent protection circuit 12 by a predetermined value that is larger than "1". Thus, the reference current value of the overcurrent protection circuit, for example, the first overcurrent protection circuit 11 of the upstream series regulator, for example, the first series regulator 91 and the reference current value of the overcurrent protection circuit, for example, the second overcurrent protection circuit 12 of the downstream series regulator, for example, the second series regulator 92 can be determined according to the magnitude relation of the resistance values of the reference potential producing resistors, for example, the second and fourth resistance elements 112 and 122.

In the embodiment described above, the reference current value of the first overcurrent protection circuit 11 is determined to be larger than the reference current value of the second overcurrent protection circuit 12 according to the magnitude relation of the resistance values of the reference potential producing resistors of the two overcurrent protection circuits. However, the reference current value of the first overcurrent protection circuit 11 may be determined to be larger than the reference current value of the second overcurrent protection circuit 12 according to the magnitude relation of the current values of currents fed from the constant current sources of the two overcurrent protection circuits.

Specifically, by setting the resistance value of the second resistance element 112 at the same value of the resistance value of the fourth resistance element 122 and by setting the current value of current fed from the constant current source 113 at a value larger than the current value of current fed from the constant current source 12, for example, a value of 1.2 times the current value, the reference current value of the first overcurrent protection circuit 11 is set at a value larger than the reference current value of the second overcurrent protection circuit 12, for example, a value of 1.2 times the reference current value.

In this manner, the resistance values of the respective current measuring resistors, for example, the first and third resistance elements 111 and 121 of the plural overcurrent protection circuits, for example, the first and second overcurrent protection circuits 11 and 12 are equal to each other, the resistance values of the respective reference potential producing resistors, for example, the second and fourth resistance elements 112 and 122 of the plural overcurrent protection circuits, for example, the first and second protection circuits 11 and 12 are equal to each other, and the current value of current fed by the constant current source, for example, the constant current source 113 of the upstream overcurrent protection circuit, for example, the first overcurrent protection circuit 11 is a value obtained by multiplying the current value of current, which is fed by the constant current source, for example, the constant current source 123 of downstream overcurrent protection circuit, for example, second overcurrent protection circuit 12, by a predetermined value that is larger than "1". Thus, the reference current value of the overcurrent protection circuit, for example, the first overcurrent protection circuit 11 of the upstream series regulator, for example, the first series regulator 91 and the reference current value of the overcurrent protection circuit, for example, the second overcurrent protection circuit 12 of the downstream series regulator, for example, the second series regulator 92 can be determined according to the magnitude relation of the current values of currents fed by the constant current sources, for example, the constant current sources 113 and 123.

Figure 2:
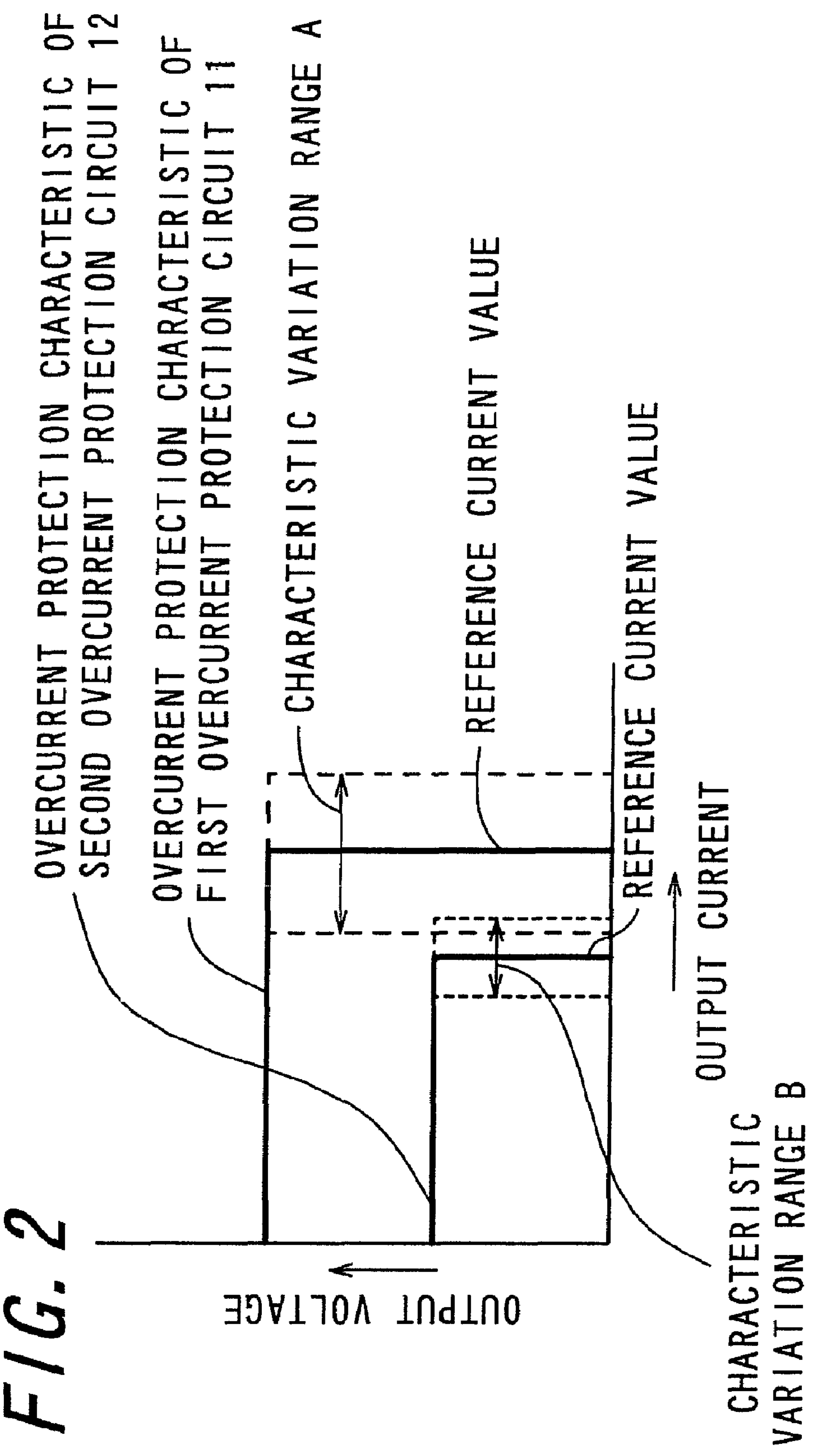
FIG. 2 is a graph showing one example of the overcurrent protection characteristics of a first overcurrent protection circuit and the overcurrent protection characteristic of a second overcurrent protection circuit.

FIG. 2 is a graph showing one example of the overcurrent protection characteristics of the first overcurrent protection circuit 11 and the overcurrent protection characteristic of the second overcurrent protection circuit 12. A vertical axis designates the output voltages of the series regulators and a horizontal axis designates the output currents of the series regulators. There are shown overcurrent protection characteristics that the output voltage is only up to a specified voltage and that the output current is only up to the reference current value.

Each of the overcurrent protection characteristics of the first overcurrent protection circuit 11 and the second overcurrent protection circuit 12, shown in FIG. 2, exhibits a drooping characteristic, and even when the output voltage varies, the reference current value is a constant value. That is, each of the first overcurrent protection circuit 11 and the second overcurrent protection circuit 12 outputs a specified output voltage, for example, 10V in the case of the first series regulator 91 and 5V in the case of the second series regulator 92 until the output current reaches the reference current value. Even if each of the first overcurrent protection circuit 11 and the second overcurrent protection circuit 12 has the input voltage decreased and hence has the output voltage decreased, each of the first overcurrent protection circuit 11 and the second overcurrent protection circuit 12 outputs the decreased voltage until the output current reaches the reference current value.

In the overcurrent protection characteristic of the first overcurrent protection circuit 11 and the overcurrent protection characteristic of the second overcurrent protection circuit 12, the reference current value of the first overcurrent protection circuit 11 is a value larger than the reference current value of the second overcurrent protection circuit 12, for example, a value of 1.2 times the reference current value, and even if the reference current value of the second overcurrent protection circuit 12 varies within a characteristic variation range B, the reference current value of the first overcurrent protection circuit 11 varies within a characteristic variation range A so as to become a value larger than the reference current value of the second overcurrent protection circuit 12, for example, a value of 1.2 times the reference current value.

Figure 3A:
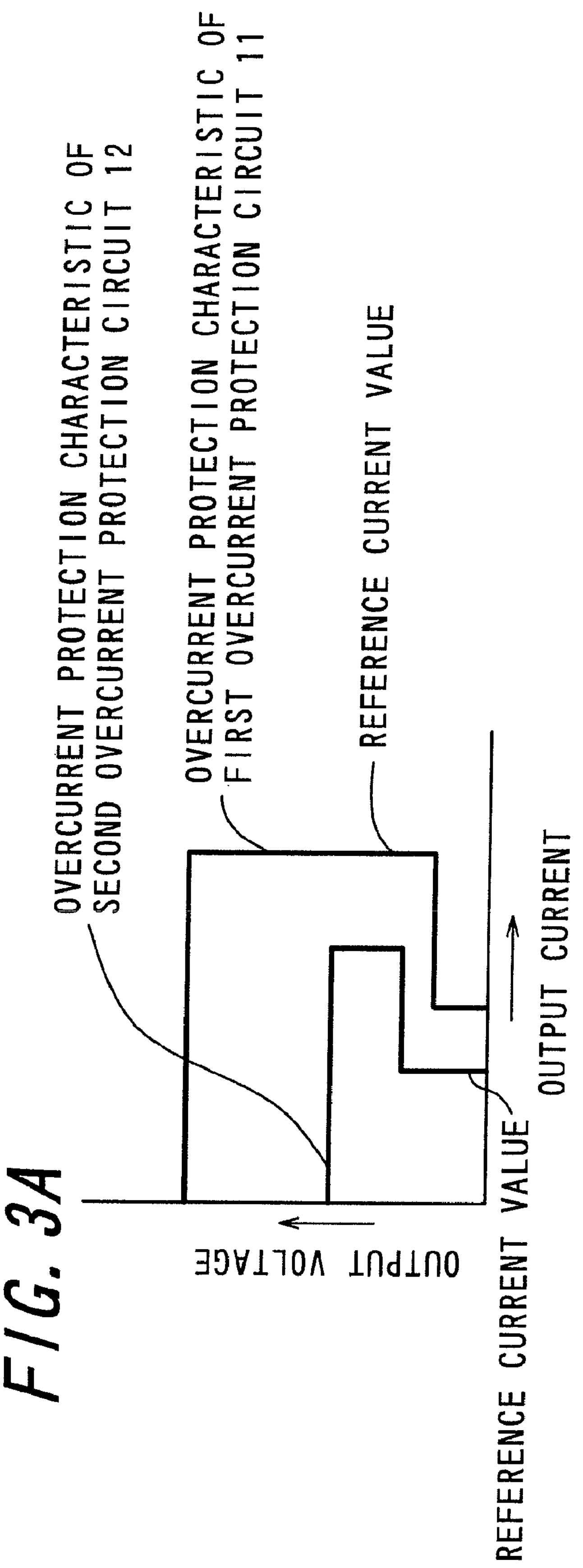
FIGS. 3A and 3B are graphs showing other examples of the overcurrent protection characteristic of the first overcurrent protection circuit and the overcurrent protection characteristic of the second overcurrent protection circuit.
Figure 3B:
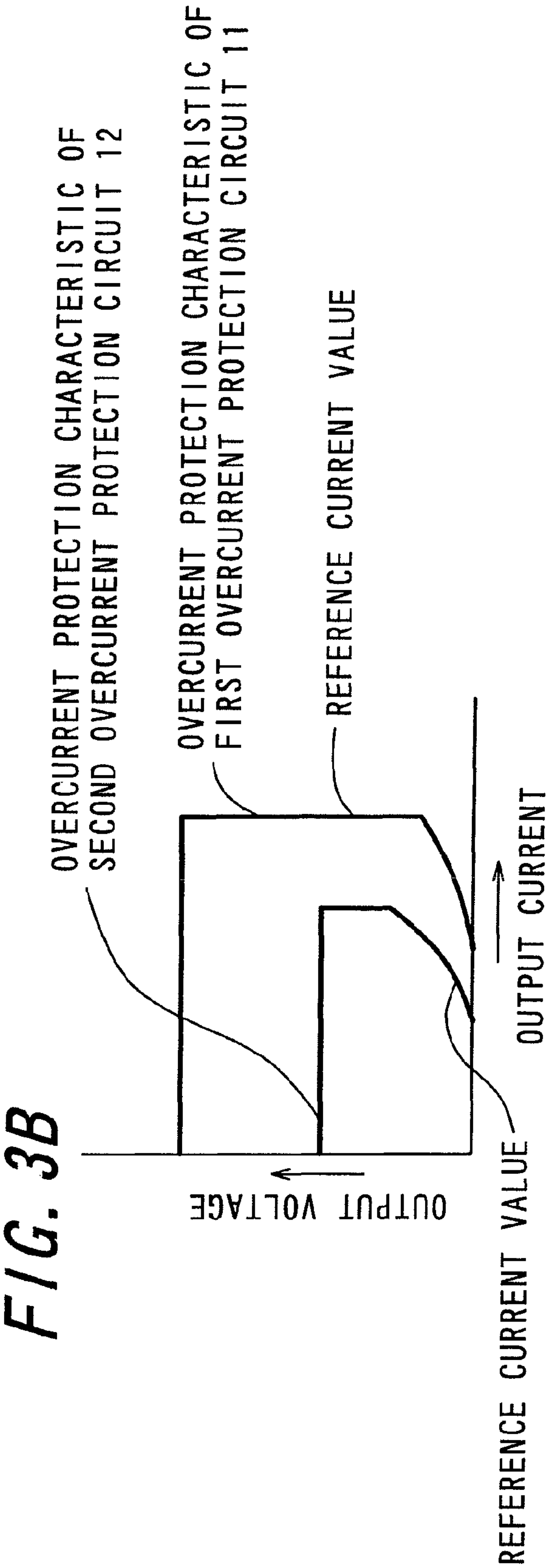

FIGS. 3A and 3B are graphs showing other examples of the overcurrent protection characteristic of the first overcurrent protection circuit 11 and the overcurrent protection characteristic of the second overcurrent protection circuit 12. FIG. 3A is an example of an overcurrent protection characteristic exhibiting a first characteristic that when the output voltage becomes lower than a predetermined voltage which is lower than a specified voltage, the reference current value is set at a constant value smaller than the reference current value of the case where the output voltage is the specified voltage. For example, when the output voltage becomes 2V that is lower than the specified voltage 10V in the case of the first series regulator 91 or when the output voltage becomes 3V that is lower than the specified voltage 5V in the case of the second series regulator 92, the reference current value is set at a value of half of the reference current value when the output voltage is the specified output voltage.

FIG. 3B is an example of an overcurrent protection characteristic exhibiting a second characteristic that when the output voltage becomes lower than a predetermined voltage which is lower than a specified voltage, the reference current value is set at a reference current value that gradually becomes smaller than the reference current value when the output voltage is the specified voltage. For example, when the output voltage becomes 2V that is lower than the specified voltage 1V in the case of the first series regulator 91, or when the output voltage becomes 3V that is lower than the specified voltage 5V in the case of the second series regulator 92, the reference current value is decreased along with a decrease in the output voltage from the reference current value when the output voltage is the specified output voltage until the reference current value becomes a value of half of the reference current value when the output voltage is the specified output voltage.

In this manner, the reference current value that the overcurrent protection circuit, for example, the first and second overcurrent protection circuits 11 and 12 intercept current flowing from the input side to the output side of the series regulator of the protection object, for example, the first and second series regulators 91 and 92 according to the magnitude of the current flowing through the series regulator of the protection object is a value determined by the overcurrent protection characteristic exhibiting one of a drooping characteristic, the first characteristic and the second characteristic. Thus, the reference current value for detecting overcurrent can be set according to a variation mode of the output voltage outputted to the load circuit.

In the embodiment described above, the power supply system 9 is constructed of two series regulators connected in series and the power source, but the number of series regulators connected in series is not limited to two. For example, the power supply system 9 can be also constructed of three or more series regulators according to a difference between the output voltage of the power source 93 and the output voltage of the most downstream series regulator, or the allowable loss of each series regulator. In this case, an overcurrent protection circuit of the same circuit construction as the first overcurrent protection circuit 11 is provided for each of the plural series regulators. As to the reference current value of each overcurrent protection circuit, in any two series regulators disposed adjacently to each other of the plural series regulators, the reference current value of the upstream series regulator is set at a value larger than the reference current value of the downstream series regulator connected to the series regulator, for example, a value of 1.2 times the reference current value.

In this manner, when the plural series regulators connected in series are protected from the overcurrent by the respective overcurrent protection circuits disposed respectively for the plural series regulators, the current flowing from the input side to the output side of the series regulator of the protection object is intercepted by the overcurrent protection circuit according to the magnitude of the current flowing through the series regulator of the protection object disposed for the overcurrent protection circuit, and when the magnitude of the current flowing through the series regulator of the protection object is smaller than the magnitude of the current flowing through the overcurrent protection circuit disposed for the upstream series regulator of two series regulators connected adjacently to each other, the current flowing from the input side to the output side of the series regulator of the protection object is intercepted by the overcurrent protection circuit disposed for the downstream series regulator of the two series regulators.

Specifically, when the first and second series regulators 91 and 92 connected in series are protected from the overcurrent by the first and second overcurrent protection circuits 11 and 12 disposed respectively for the first and second series regulators 91 and 92, the current flowing from the input side to the output side of the second series regulator 92 is intercepted by the second overcurrent protection circuit 12 according to the magnitude of the current flowing through the second series regulator 92 disposed for the second overcurrent protection circuit 12, and when the magnitude of the current flowing through the second series regulator 92 is smaller than the magnitude of the current flowing through the first overcurrent protection circuit 11 disposed for the first series regulator 91, the current flowing from the input side to the output side of the second series regulator 92 is intercepted by the second overcurrent protection circuit 12 disposed for the second series regulator 92.

Thus, the downstream overcurrent protection circuit, for example, the second overcurrent protection circuit 12 operates first, so that even if overcurrent is caused by a ground fault on the output side of the series regulator of the final stage, for example, the second series regulator 92, all of the series regulators, for example, the first and second series regulators 91 and 92 can be protected.

Further, in each of the overcurrent protection circuits, for example, the first and second overcurrent protection circuits 11 and 12, the current measuring resistor, for example, the first and third resistance elements 111 and 112 is connected in series to the upstream aide of the series regulator of the protection object, for example, the first and second series regulators 91 and 92; the reference potential for intercepting the current flowing from the input side to the output side of the series regulator of the protection object is produced by the reference potential producing resistor having one end connected to the upstream side of the current measuring resistor, for example; the second and fourth resistance elements 112 and 122, according to the flowing current; the current of a current value predetermined for the reference potential producing resistor is fed by the constant current source, for example, the constant current sources 113 and 123; when the transistor, for example, the transistors 115 and 125 is brought into a conducting state, the current flowing from the input side to the output side of the series regulator of the protection object is intercepted by the transistor, for example, the transistors 115 and 125; and the electric potential on the downstream side of the current measuring resistor is compared with the electric potential of the reference potential producing resistor, which is subjected to a voltage drop by the current fed by the constant current source, by the comparator, for example, the comparators 114 and 124 and when the electric potential on the downstream side of the current measuring resistor is lower than the electric potential of the reference potential producing resistor which is subjected to the voltage drop, the transistor is brought into the conducting state. Thus, the overcurrent protection circuit, for example, the first and second overcurrent protection circuits 11 and 12 can be constructed of parts reduced in shape and hence can be used for an apparatus required to be reduced in size.

Figure 4:
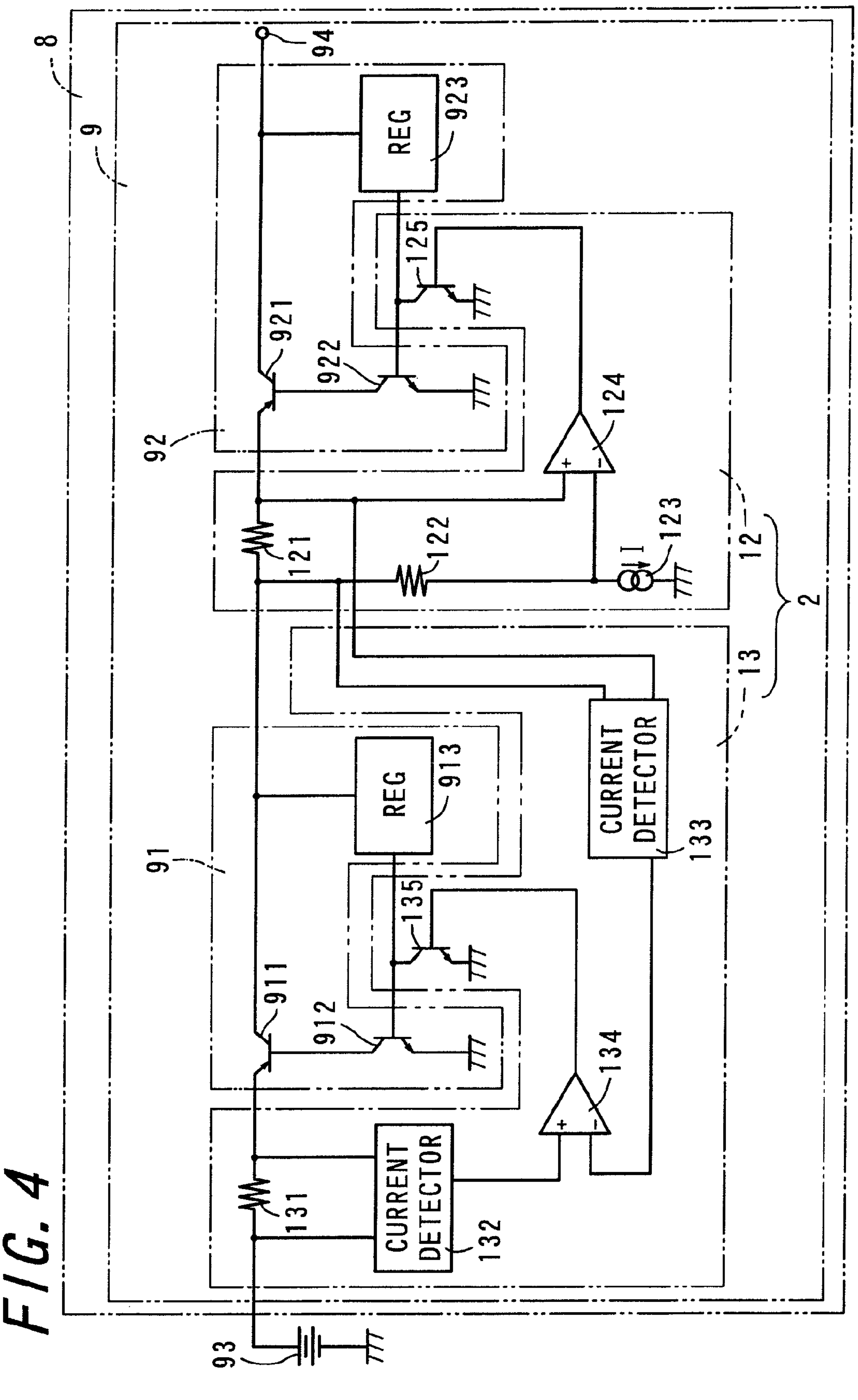
FIG. 4 is a diagram showing the circuit construction of an overcurrent protection circuit and the power supply system according to another embodiment of the invention.

FIG. 4 is a diagram showing the circuit construction of an overcurrent protection circuit 2 and the power supply system 9 according to another embodiment of the invention. The power supply system 9 shown in FIG. 4 is the same as the power supply system 9 shown in FIG. 1, and the respective constituent elements are denoted by the same reference numerals and the description of the power supply system 9 will be omitted so as to avoid duplication. The overcurrent protection circuit 2 includes two overcurrent protection circuits 12 and 13. The second overcurrent protection circuit 12 shown in FIG. 4 is the same as the second overcurrent protection circuit 12 shown in FIG. 1, and the respective constituent elements are denoted by the same reference numerals and the description of the second overcurrent protection circuit 12 will be omitted so as to avoid duplication. The third resistance element 121 is a first current measuring resistor, the transistor 125 is a first transistor, and the comparator 124 is a first comparator.

The third overcurrent protection circuit 13 includes a fifth resistance element 131, current detectors 132 and 133, a comparator 134, and a transistor 135. The fifth resistance element 131 serving as a second current measuring resistor, is the same as the first resistance element 111 shown in FIG. 1, and the transistor 135 serving as a second transistor, is the same as the transistor 115 shown in FIG. 1, and the description of these parts will be omitted so as to avoid duplication.

The current detector 132 serving as a first current detector, detects a current value which is a first current value of current flowing through the fifth resistance element 131 by the difference of electric potential between both ends of the fifth resistance element 131. The current detector 133 serving as a second current detector, detects a current value which is a second current value of current flowing through the third resistance element 121 serving as the current measuring resistor of the downstream second series regulator 92, by the difference of electric potential between both ends of the third resistance element 121. The comparator 134 serving as a second comparator, brings the transistor 135 into the conducting state when a value obtained by subtracting a current value detected by the current detector 133 from the current value detected by the current detector 132 is equal to or larger than a predetermined reference difference current value, for example, by 20% or more of the reference current value of the second overcurrent protection circuit 12.

In the embodiment shown in FIG. 4, the power supply system 9 is constructed of two series regulators connected in series and the power source, but the number of series regulators connected in series is not limited to two. For example, the power supply system 9 can be constructed of three or more series regulators according to the difference between the output voltage of the power source 93 and the output voltage of the most downstream series regulator or the allowable loss of each series regulator. In this case, the most downstream series regulator is provided with the second overcurrent protection circuit 12, and the remaining series regulators except the most downstream series regulator of the plural series regulators are provided with the same overcurrent protection circuits as the third overcurrent protection circuit 13, respectively. Each of the overcurrent protection circuits disposed for the remaining series regulators except the most downstream series regulator intercepts current flowing through the series regulator relating to each overcurrent protection circuit when a value obtained by subtracting a current value of the current flowing through the series regulator connected to the downstream side of the series regulator relating to each overcurrent protection circuit from a current value of the current flowing through the series regulator relating to each overcurrent protection circuit is equal to or larger than a predetermined reference difference current value.

In this manner, in the overcurrent protection circuit disposed for the most downstream series regulator of the plural overcurrent protection circuits, a first current measuring resistor is connected in series to the upstream side of the series regulator of the protection object. The reference potential for intercepting the current flowing from the input side to the output side of the series regulator of the protection object is produced by the reference potential producing resistor having one end connected to the upstream side of the first current measuring resistor according to the flowing current, and the current of a current value predetermined for the reference potential producing resistor is fed by the constant current source. When a first transistor is brought into the conducting state, the current flowing from the input side to the output side of the series regulator of the protection object is intercepted by the first transistor. The electric potential on the downstream side of the first current measuring resistor is compared with the electric potential of the reference potential producing resistor, which is subjected to a voltage drop by the current fed by the constant current source, by the first comparator. When the electric potential on the downstream side of the first current measuring resistor is lower than the electric potential of the reference potential producing resistor which is subjected to the voltage drop, the first transistor is brought into the conducting state.

Specifically, in the second overcurrent protection circuit 12 of the second and third overcurrent protection circuits 12 and 13, the third resistance element 121 is connected in series to the upstream side of the second series regulator 92. The reference potential for intercepting the current flowing from the input side to the output side of the second series regulator 92 is produced by the fourth resistance element 122 having one end connected to the upstream side of the third resistance element 121 according to the flowing current, and the current of a current value predetermined for the reference potential producing resistor is fed by the constant current source 123. When the transistor 125 is brought into the conducting state, the current flowing from the input side to the output side of the second series regulator 92 is intercepted by the transistor 125. The electric potential on the downstream side of the third resistance element 121 is compared with the electric potential of the fourth resistance element 122, which is subjected to a voltage drop by the current fed by the constant current source 123, by the comparator 124. When the electric potential on the downstream side of the third resistance element 121 is lower than the electric potential of the fourth resistance element 122 which is subjected to the voltage drop, the transistor 125 is brought into the conducting state.

Further, in each of the remaining overcurrent protection circuits except the overcurrent protection circuit of the series regulator disposed on the most downstream side of the plural overcurrent protection circuits, a second current measuring resistor is connected to the upstream side of the series regulator of the protection object. A first current value is detected by a first current detector on the basis of the difference of electric potential between both ends of the second current measuring resistor. A second current value is detected by a second current detector on the basis of the difference of electric potential between both ends of the first current measuring resistor or the second current measuring resistor, the first current measuring resistor being included by each overcurrent protection circuit of the series regulator connected to the downstream side of the series regulator of the protection object. When a second transistor is brought into a conducting state, the current flowing from the input side to the output side of the series regulator of the protection object is intercepted by the second transistor. The second current value detected by the second current detector is subtracted from the first current value detected by the first current detector by a second comparator. When the difference between the first current value and the second current value is a predetermined reference difference current value or more, the second transistor is brought into the conducting state.

Specifically, in the third overcurrent protection circuit 13 of the second and third overcurrent protection circuits 12 and 13, the fifth resistor element 131 is connected to the first series regulator 91. A first current value is detected by the current detector 132 on the basis of the difference of electric potential between both ends of the fifth resistance element 131. A second current value is detected by the current detector 133 on the basis of the difference of electric potential between both ends of the third resistance element 121 or the fifth resistance element 131, the third resistance element 121 being included by the second overcurrent protection circuit 12 of the second series regulator 92 connected to the downstream side of the first series regulator 91. When the transistor 135 is brought into a conducting state, the current flowing from the input side to the output side of the first series regulator 91 is intercepted by the transistor 135. The second current value detected by the current detector 133 is subtracted from the first current value detected by the current detector 132 by the comparator 134. When the difference between the first current value and the second current value is a predetermined reference difference current value or more, the transistor 135 is brought into the conducting state.

In other words, the reference current value of the overcurrent protection circuit of the upstream series regulator can be determined by the difference between the current value of the current flowing through the upstream series regulator and the current value of current flowing through the downstream series regulator. Thus, by selecting the value of the reference difference current value in such a way that the downstream overcurrent protection circuit operates first, even if overcurrent is caused by a ground fault on the output side of the series regulator of the final stage, all series regulators can be protected.

Specifically, the reference current value of the third overcurrent protection circuit 13 of the first series regulator 91 can be determined by the difference between the current value of the current flowing through the first series regulator 91 and the current value of current flowing through the second series regulator 92. Thus, by selecting the value of the reference difference current value in such a way that the second overcurrent protection circuit 12 operates first, even if overcurrent is caused by a ground fault on the output side of the second series regulator 92, the series regulators 91 and 92 can be protected.

The overcurrent protection apparatus 1 can be applied to an electronic apparatus 8 using the power supply system 9 including plural series regulators, for example, a navigation device or an audio device mounted in a vehicle.

In this manner, the electronic apparatus 8 includes a plurality of series regulators, for example, the first and second series regulators 91 and 92, and the overcurrent protection apparatus 1 or the overcurrent protection apparatus 2 which protects the plurality of series regulators, for example, the first and second series regulators 91 and 92 from overcurrent. Accordingly, even when overcurrent is caused by a ground fault on the output side of the series regulator of the final stage of the plural series regulators provided in the electronic apparatus 8, the electronic apparatus 8 can protect all of the series regulators from the overcurrent. Thus, the electronic apparatus 8 resistant to the ground fault can be realized.

In this regard, overcurrent protection in the case of using the series regulators of two stages has been described in the embodiments. However, even in the case of using series regulators of three or more stages, the invention is applicable to the case and can produce the same effect.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An overcurrent protection apparatus comprising:

a plurality of overcurrent protection circuits connected in series, for protecting each of a plurality of series regulators from overcurrent, the plurality of overcurrent protection circuits each being disposed for each of the plurality of series regulators, wherein the overcurrent protection circuit intercepts a current flowing from an input side to an output side of the series regulator of a protection object according to a magnitude of the current flowing through the series regulator of the protection object disposed for the overcurrent protection circuit, and when the magnitude of the current flowing through the series regulator of the protection object is smaller than the magnitude of the current flowing through the overcurrent protection circuit disposed for an upstream series regulator of two series regulators connected adjacently to each other, the overcurrent protection circuit disposed for a downstream series regulator of the two series regulators intercepts the current flowing from the input side to the output side of the series regulator of the protection object.

2. The overcurrent protection apparatus of claim 1, wherein the overcurrent protection circuit comprises:

a current measuring resistor being connected in series to an upstream side of the series regulator of the protection object;

a reference potential producing resistor having one end connected to an upstream side of the current measuring resistor, for producing a reference potential for intercepting the current flowing from the input side to the output side of the series regulator of the protection object according to the flowing current;

a constant current source for feeding current of a current value predetermined for the reference potential producing resistor;

a transistor for intercepting the current flowing from the input side to the output side of the series regulator of the protection object when brought into a conducting state; and a comparator for comparing an electric potential on a downstream side of the current measuring resistor with an electric potential of the reference potential producing resistor that is subjected to a voltage drop by current fed by the constant current source, and bringing the transistor into the conducting state when the electric potential on the downstream side of the current measuring resistor is lower than the electric potential of the reference potential producing resistor that is subjected to the voltage drop.

3. The overcurrent protection apparatus of claim 2, wherein resistance values of the respective current measuring resistors of the plurality of overcurrent protection circuits are same values, current values of currents fed by the respective constant current sources of the plurality of overcurrent protection circuits are same values, and a resistance value of the reference potential producing resistor of the upstream overcurrent protection circuit is a value obtained by multiplying a resistance, value of the reference potential producing resistor of the downstream overcurrent protection circuit by a predetermined numeral larger than a numeral of "1".

4. The overcurrent protection apparatus of claim 2, wherein resistance values of the respective current measuring resistors of the plurality of overcurrent protection circuits are same values, resistance values of the respective reference potential producing resistors of the plurality of overcurrent protection circuits are same values, and a current value of the current fed by the constant current source of the upstream overcurrent protection circuit is a value obtained by multiplying a current value of the current fed by the constant current source of the downstream overcurrent protection circuit by a predetermined numeral larger than a numeral of "1".

5. The overcurrent protection apparatus of claim 1, wherein the overcurrent protection circuit of the series regulator, which is disposed on the most downstream side, of the plurality of overcurrent protection circuits comprises:

a first current measuring resistor being connected in series to an upstream side of the series regulator of the protection object;

a reference potential producing resistor having one end connected to an upstream side of the first current measuring resistor, for producing a reference potential for intercepting the current flowing from the input side to the output side of the series regulator of the protection object according to the flowing current;

a constant current source for feeding current of a current value previously determined for the reference potential producing resistor;

a first transistor for intercepting the current flowing from the input side to the output side of the series regulator of the protection object when brought into a conducting state; and a first comparator for comparing an electric potential on a downstream side of the first current measuring resistor with an electric potential of the reference potential producing resistor that is subjected to a voltage drop by the current fed by the constant current source, and bringing the first transistor into the conducting state when the electric potential on the downstream side of the first current measuring resistor is lower than the electric potential of the reference potential producing resistor that is subjected to the voltage drop, and wherein each of the remaining overcurrent protection circuits except the overcurrent protection circuit of the series regulator disposed on the most downstream side of the plurality of overcurrent protection circuits comprises:

a second current measuring resistor being connected to an upstream side of the series regulator of the protection object;

a first current detector for detecting a first current value on a basis of a difference of electric potential between both ends of the second current measuring resistor;

a second current detector for detecting a second current value on a basis of a difference of electric potential between both ends of the first current measuring resistor or the second current measuring resistor, the first current measuring resistor being included by each of the overcurrent protection circuit connected to a downstream side of the series regulator of the protection object;

a second transistor for intercepting the current flowing from the input side to the output side of the series regulator of the protection object when brought into a conducting state; and a second comparator for subtracting the second current value detected by the second current detector from the first current value detected by the first current detector, and bringing the second transistor into the conducting state when the difference between the first current value and the second current value is a predetermined reference difference current value or more.

6. The overcurrent protection apparatus of claim 1, wherein a reference current value at which the overcurrent protection circuit intercepts the current flowing from the input side to the output side of the series regulator of the protection object according to magnitude of the current flowing through the series regulator of the protection object is a value determined by any one of overcurrent protection characteristics exhibiting one of:

a drooping characteristic;

a first characteristic that when the output voltage becomes lower than a predetermined voltage which is lower than a specified voltage, the reference current value is set at a constant value smaller than the reference current value of the case where the output voltage is the specified voltage; and a second characteristic that when the output voltage becomes lower than a predetermined voltage which is lower than a specified voltage, the reference current value is set at a reference current value that gradually becomes smaller than the reference current value when the output voltage is the specified voltage.

7. An electronic apparatus comprising:

a plurality of series regulators; and the overcurrent protection apparatus of claim 1, for protecting the plurality of series regulators from overcurrent.

* * * * *